Patented Jan. 1, 1946

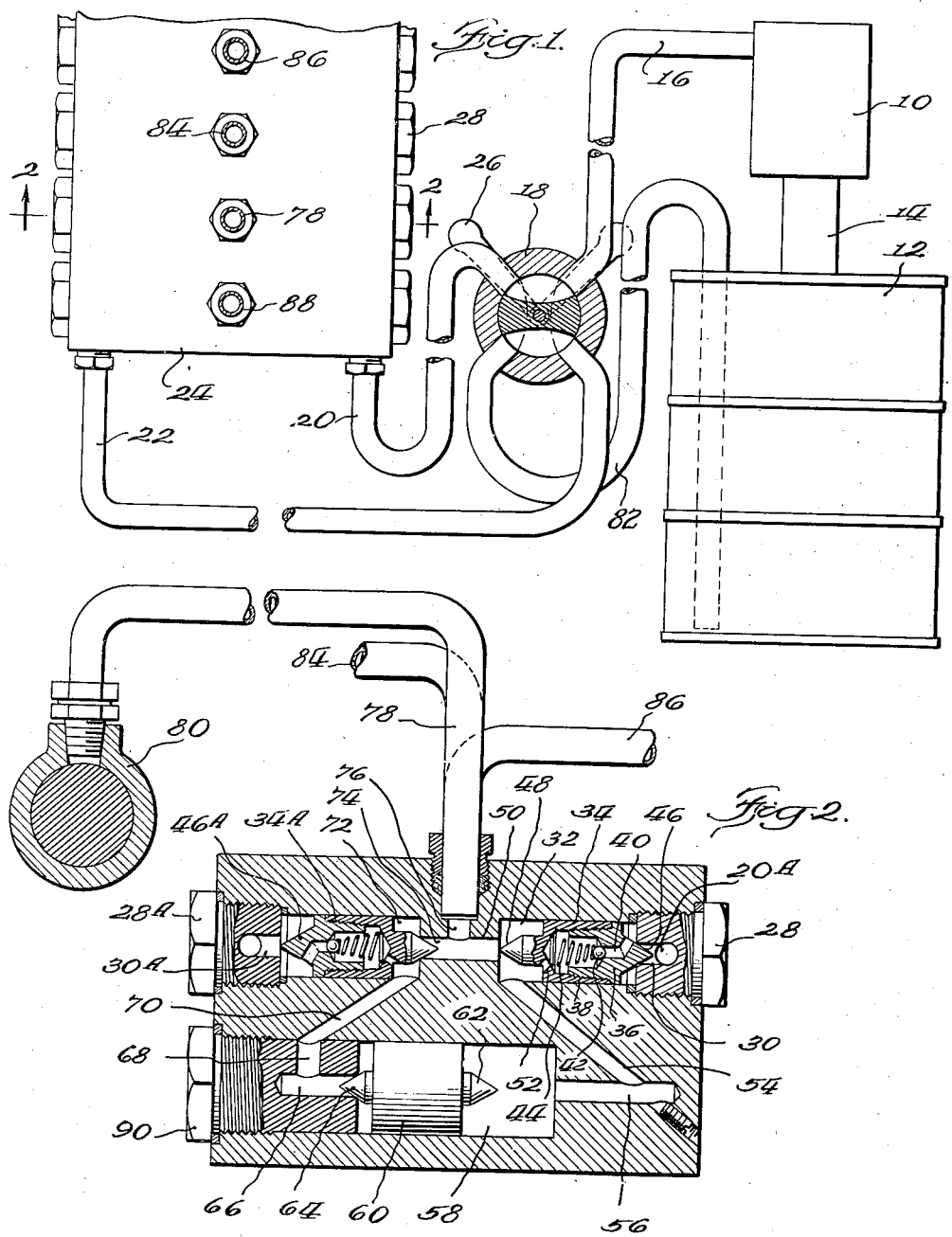

2,392,017

UNITED STATES PATENT OFFICE 2,392,017

MEASURING VALVE

Reuben Wedeberg, Chicago, Ill., assignor to Stewart-Warner Corporation, Chicago, Ill., a corporation of Virginia Application June 15, 1942, Serial No. 447,193

8 Claims. (Cl. 184—7)

My invention relates to measuring valves and more particularly to measuring valves for centralized lubricating systems wherein a plurality of bearings are supplied with lubricant from a common source and the amount of lubricant supplied to each bearing is accurately measured to correspond to the needs of that bearing.

An object of my invention is to provide a measuring valve which accurately measures the quantity of lubricant supplied thereby to its bearing, but which is subjected to only small pressure differential across the metering element.

Another object of my invention is to provide a measuring valve which will accurately measure the quantities of lubricant supplied thereby, even though the metering element fits loosely in the chamber in which it moves and even though the lubricant is supplied to the bearing under high pressure.

Another object of my invention is to provide a new and improved measuring valve which can be cheaply and quickly made by mass production methods.

Other objects and advantages will become apparent as the description proceeds.

In the drawing:

Fig. 1 is a diagrammatic view of a lubricating system embodying a preferred form of my invention;

Fig. 2 is a vertical sectional view of a measuring valve made according to my invention and is taken on the line 2—2 of Fig. 1.

Referring to Fig. 1 it will be seen that I have illustrated therein a lubricant compressor 10 mounted on a drum 12 of grease, oil or other suitable lubricant and having an inlet 14 extending down into the lubricant in the drum 12. The pump 10 may be of any suitable construction and may be either manually or power driven. This pump serves to withdraw lubricant from the drum or container 12 and forces it under pressure through a discharge conduit 16 leading to a four-way valve 18.

My new and improved measuring valve is designed for use in a dual line type of lubricating system and the valve 18 is adapted to connect the discharge conduit 16 alternately with lines 20 and 22 leading to the several measuring valves located in the block 24 and connected in parallel to these lines. The valve 18 is illustrated as being provided with a handle 26 for shifting the valve from one position to another, but in lieu of the manually operated valve shown in the drawing, timed power driven valves may be substituted since such valves are commonly used in dual line types of lubricating systems.

In the position shown in Fig. 1, the valve 18 connects the discharge conduit 16 with the line 20 so that lubricant discharged under pressure from the pump 10 creates a pressure in the longitudinal passageway 20A extending lengthwise of the block 24 and constituting an extension or continuation of the line 20. As clearly shown in Fig. 2, the passageway 20A extends through plugs 28 which are screwed into the side of block 24 and each of which has a valve inlet port 30 communicating with passageway 20A and line 20. Each port 30 communicates with a cylindrical chamber 32 containing a piston 34 slidable therein.

The piston 34 comprises tubular members 36 and 38 threadedly secured together. The tubular member 36 has a passageway 40 therethrough and a ball valve 42 is normally held in a position closing this passageway 40 by a spring 44 confined between the members 36 and 38. The tubular member 36 has a tapered end 46 functioning as a valve to close the inlet port 30 when the piston is in the position shown in Fig. 2. The tubular member 38 has a tapered end 48 acting as a valve to close an outlet port 50 when the piston 34 is moved to the left, as viewed in Fig. 2. This tubular member 38 has a passageway 52 therethrough and in communication with the passageway 40.

Lubricant forced through the inlet 30 moves piston 34 to the left, as viewed in Fig. 2, and causes the tapered end 48 to close outlet 50. Thereafter lubricant forced through the inlet 30 passes through passageway 40, displaces valve 42 and passes out of passageway 52 into the lefthand end of cylinder 32. This lubricant then flows through bores 54 and 56 to the righthand end of metering chamber 58. If the piston 60 is in its righthand position with tapered end 62 closing bore 56, the piston 60 is shifted to the position shown in Fig. 2 with tapered end 64 closing bore 66.

During this leftward movement of piston 60, any lubricant located in chamber 58 to the left of the piston 60 would be forced through bores 66, 68 and 70 to cylinder 72 which contains a piston 34A identical with the piston 34 heretofore described. The discharge of lubricant from the metering chamber would cause piston 34A to move from the position shown in Fig. 2 to a position where the tapered end 46A of this piston would close the port 30A in plug 28A and thereafter all lubricant discharged from metering chamber 58 would flow through outlet 74, duct 76 and pipe 78 to bearing 80 connected to this particular measuring valve.

In the position shown in Fig. 1, valve 18 also connects line 22 with a return conduit 82 discharging into the drum or receptacle 12, so that any lubricant displaced by lefthand movement of the pistons 34A can flow through line 22 to valve 18 and thence through discharge pipe 82 back to drum 12.

After the pistons 60 have completed their leftward stroke a second measured charge of lubricant can be supplied to each of the bearings by shifting valve handle 26 from the full line position to the dotted line position shown in Fig. 1 and again operating the lubricant compressor 10. This shifting of valve 18 connects discharge conduit 16 with line 22 and forces lubricant through inlet ports 30A into cylinders 72. Pistons 34A in these cylinders then shift to the right to assume the position shown in Fig. 2 and lubricant then flows through these pistons and through bores 70, 68 and 66 into the lefthand end of metering chamber 58, thereby moving piston 60 to the right and discharging from chamber 58 the lubricant located to the right of the piston therein.

The lubricant discharged from the righthand ends of the metering chambers 58 flows through bores 56 and 54 to the lefthand ends of cylindrical chamber 32 and shifts piston 34 to the position shown in Fig. 2, whereupon the lubricant discharged from the metering chambers may flow through outlets 50, ducts 76 and through the several pipes 78, 84, 86 and 88 to the bearings connected therewith. During this operation valve 18 connects line 29 with return pipe 82 so that any lubricant displaced by rightward movement of the pistons 34 can return to lubricant drum 12.

While I have illustrated the particular lubricating system described herein as having a block or casting 24 containing a plurality of measuring valves, such an arrangement is optional and if preferred each measuring valve may be separate and independent of all other measuring valves. It is to be noted that the pistons 34 and 34A are identical and that the plugs 28 and 28A are likewise identical, thereby reducing the number of different parts. The lefthand end of metering chamber 58 is closed by a screw plug 90 threaded into the block 24 and this plug contains the bores 66 and 68. The arrangement of the bores or other passageways in the block 24 is simple and these passageways may be easily formed by conventional methods.

An important feature of my invention lies in the fact that the piston 60 may have a relatively loose fit in the metering chamber 58 without impairing the accuracy of my measuring valve, since the pressure differential across this piston during its movement from one end of the metering chamber to the other end thereof need only be sufficient to overcome the inertia and frictional resistance of the piston. Since this piston is light and moves in a well lubricated chamber, its inertia and frictional resistance are extremely low and there is no appreciable tendency to leak past the piston 60 as it moves from one extreme of its stroke to the other extreme.

The check valves 42 in the pistons 34 and 34A are preferably under light spring tension, since the only purpose of these check valves is to build up a sufficient pressure differential on opposite sides of these pistons to cause them to slide in their cylinders 32. These pistons are light and well lubricated so that they offer little resistance to movement and a slight pressure differential suffices. Because of the small resistance offered by the check valve 42, there is no appreciable pressure differential across the piston adjacent the inlet line while lubricant is flowing to the bearing.

While I have illustrated and described only a single embodiment of my invention, it will be understood that my invention may assume numerous other forms and that the scope of my invention is defined in the following claims.

I claim:

1. A measuring valve of the class described comprising a pair of cylinders having outlet ends, conduit means connecting an outlet end of one cylinder with an outlet end of the other cylinder and with a bearing requiring lubrication, an inlet for each cylinder, pistons reciprocable independently of each other in said cylinders, a metering chamber, means connecting each end of said metering chamber to an outlet end of one of said cylinders, a piston in said metering chamber, a passageway through each of said first-named pistons, and a check valve in each passageway.

2. A measuring valve comprising a pair of aligned cylinders, an outlet passageway connecting adjacent ends of said cylinders and adapted to be connected to a bearing requiring lubrication, a lubricant inlet for the opposite end of each of said cylinders, a piston reciprocable in each of said cylinders, a passageway through each of said pistons, a check valve in each piston passageway, means provided by each piston for sealing the inlet for its cylinder, means provided by each piston for sealing the outlet for its cylinder, a cylindrical metering chamber having an axis parallel with the axis of said cylinders, a port at each end of said metering chamber, conduit means connecting each of said ports with the outlet end of one of said cylinders, a piston freely movable in said metering chamber between said ports, and means carried by said last-named piston for closing each of said ports.

3. A measuring valve comprising a pair of cylinders, an outlet passageway connecting adjacent ends of said cylinders and adapted to be connected to a bearing requiring lubrication, a lubricant inlet for the opposite end of each of said cylinders, a piston freely reciprocable in each of said cylinders, a valved passageway through each of said pistons permitting lubricant flow from its cylinder inlet through the piston toward the outlet end of said cylinder but preventing reverse flow of lubricant through said passageway, means provided by each piston for sealing the inlet for its cylinder, means provided by each piston for sealing the outlet for its cylinder, a cylindrical metering chamber having an axis parallel with the axis of said cylinders, a port at each end of said metering chamber, conduit means connecting each of said ports with the outlet end of one of said cylinders, a piston freely movable in said metering chamber between said ports, and means carried by said last-named piston for closing each of said ports.

4. A measuring valve comprising a plurality of cylinders, an outlet passageway connecting adjacent ends of said cylinders and adapted to be connected to a bearing requiring lubrication, a lubricant inlet for the opposite end of each of said cylinders, a piston reciprocable in each of said cylinders, a valved passageway through each of said pistons permitting lubricant flow from its cylinder inlet through the piston toward the outlet end of said cylinder, but preventing reverse flow of lubricant through said passageway, means provided by each piston for sealing the inlet for its cylinder, means provided by each piston for sealing the outlet for its cylinder, a cylindrical metering chamber, a port at each end of said metering chamber, conduit means connecting each of said ports with the outlet end of one of said cylinders, a piston movable in said metering chamber between said ports, and means carried by said last-named piston for closing each of said ports.

5. A measuring valve comprising a pair of aligned cylinders, an outlet passageway connecting adjacent ends of said cylinders and adapted to be connected to a bearing requiring lubrication, a lubricant inlet for the opposite end of each of said cylinders, a piston reciprocable in each of said cylinders, a bypass for each of said pistons, means responsive to movement of each piston for sealing the inlet and outlet for its cylinder, a metering chamber, a port at each end of said metering chamber, conduit means connecting each of said ports with the outlet end of one of said cylinders, a piston movable in said metering chamber between said ports, and means responsive to movement of said last-named piston for closing each of said ports.

6. A measuring valve of the class described, comprising a pair of cylinders having outlet ends, a passageway connecting an outlet end of one cylinder with an outlet end of the other cylinder, conduit means connecting said passageway to a bearing requiring lubrication, an inlet for each cylinder, a piston reciprocable in each cylinder, a metering chamber, means connecting each end of said metering chamber to an outlet end of one of said cylinders, a passageway through each of said pistons, a check valve in each of said piston passageways opening toward the outlet end of said cylinder, and means in said metering chamber adapted to stop the feed of lubricant through said pistons by cutting off communication between said metering chamber and one of said cylinders.

7. A measuring valve of the class described, comprising a pair of cylinders having outlet ends, a passageway connecting an outlet end of one cylinder with an outlet end of the other cylinder and having an outlet adapted to be connected to a bearing, an inlet for each cylinder, a piston reciprocable in each cylinder, a metering chamber, means connecting each end of said metering chamber to an outlet end of one of said cylinders, a passageway through each of said pistons, a check valve in each of said piston passageways opening toward the outlet end of the cylinder, and means comprising a piston in said metering chamber adapted to stop the feed of lubricant through said first named pistons by cutting off communication between said metering chamber and one of said cylinders.

8. A measuring valve of the class described, comprising a pair of cylinders having outlet ends, a passageway connecting an outlet end of one cylinder with an outlet end of the other cylinder, conduit means connecting said passageway to a bearing requiring lubrication, an inlet for each cylinder, a piston freely reciprocable in each cylinder, a metering chamber, means connecting each end of said valve chamber to an outlet end of one of said cylinders, a valved passageway through each of said pistons, a piston freely reciprocable in said metering chamber, and valve means carried by said last named piston adapted to stop the feed of lubricant through said first named pistons by closing off communication between said metering chamber and one of said cylinders.

REUBEN WEDEBERG.